(12) United States Patent
Cho

(10) Patent No.: US 7,362,579 B2
(45) Date of Patent: Apr. 22, 2008

(54) PORTABLE ELECTRONIC APPARATUS HAVING A COOLING DEVICE

(75) Inventor: Kyung-il Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/368,693

(22) Filed: Mar. 7, 2006

(65) Prior Publication Data

US 2006/0198101 A1 Sep. 7, 2006

(30) Foreign Application Priority Data

Mar. 7, 2005 (KR) ...................... 10-2005-0018710

(51) Int. Cl.
*H05K 7/20* (2006.01)
*H04M 1/00* (2006.01)
*F28D 15/00* (2006.01)

(52) U.S. Cl. ................ 361/707; 361/704; 165/104.33; 165/185; 455/575.3; 455/575.4

(58) Field of Classification Search ............... 361/707, 361/704; 379/433.11–433.13; 455/575.1, 455/575.3–575.4; 165/104.33, 185
See application file for complete search history.

(56) References Cited

U.S. PATENT DOCUMENTS

| | | | | |
|---|---|---|---|---|
| 5,991,638 A | * | 11/1999 | Kim et al. | ................ 455/575.3 |
| 6,191,938 B1 | * | 2/2001 | Ohgami et al. | ............. 361/681 |
| 6,952,860 B2 | * | 10/2005 | Kawamoto | ................... 16/285 |
| 7,263,390 B2 | * | 8/2007 | Lin | ......................... 455/575.1 |
| 2004/0147296 A1 | * | 7/2004 | Lin | ......................... 455/575.3 |
| 2005/0075151 A1 | * | 4/2005 | Hou | ....................... 455/575.3 |
| 2005/0176471 A1 | * | 8/2005 | Masuda et al. | ............. 455/566 |
| 2005/0239522 A1 | * | 10/2005 | Ting | ....................... 455/575.3 |
| 2006/0262500 A1 | * | 11/2006 | Huang et al. | ............... 361/687 |
| 2006/0274506 A1 | * | 12/2006 | Huang et al. | ............... 361/704 |

FOREIGN PATENT DOCUMENTS

| | | | | |
|---|---|---|---|---|
| JP | 05037442 A | * | 2/1993 |
| JP | 2000148305 A | * | 5/2000 |
| JP | 2001136252 A | * | 5/2001 |
| JP | 2004207661 A | * | 7/2004 |
| KR | 2001104439 A | * | 11/2001 |

* cited by examiner

*Primary Examiner*—Jayprakash Gandhi
*Assistant Examiner*—Robert J Hoffberg
(74) *Attorney, Agent, or Firm*—Sughrue Mion, PLLC

(57) ABSTRACT

A portable apparatus includes an apparatus body including a first main body having therein a plurality of electric parts, and a second main body connected to the first main body to open and close a part of a surface of the first main body; a radiation member mounted in the second main body; and a heat transmitter mounted in the first main body to be connected with the electric parts at one side and contacted with the radiation member when the first main body is opened by operating the second main body. Since the radiation member is mounted to the second main body that does not frequently contact with a user during use of the portable apparatus, cooling of the portable apparatus can be efficiently performed.

15 Claims, 3 Drawing Sheets

PORTABLE ELECTRONIC APPARATUS HAVING A COOLING DEVICE

CROSS-REFERENCE TO RELATED APPLICATIONS

This application claims priority under 35 U.S.C. § 119(a) of Korean Patent Application No. 2005-18710, filed Mar. 7, 2005, the entire contents of which are incorporated herein by reference.

BACKGROUND OF THE INVENTION

1. Field of the Invention

The present invention relates to a portable apparatus. More particularly, the present invention relates to a portable electronic apparatus capable of cooling a main body thereof during operation, by including a cooling device.

2. Description of the Related Art

Generally, a portable apparatus refers to an apparatus capable of processing wireless information and sound/image information while being carried, such as a mobile phone, a portable multimedia player (PMP), a digital camera, a personal digital assistant (PDA), and a laptop computer.

Recently, the portable apparatuses have been advanced to meet users' various demands by being equipped with multi-functions. Accordingly, more and more high-efficiency electric parts are being mounted in the portable apparatus. The electric parts include an amplifier used for a synchronizer for signal reception, a sound/image processing element, and a main controlling element for main control of the portable apparatus. Such electric parts shall generate a driving heat while performing complicated jobs at high speed, thereby increasing inner temperature of the portable apparatus. The increase of the inner temperature may fatally damage some thermal-sensitive electric parts. Furthermore, as the tendency is toward minimization of the portable apparatus for ease of carrying, the above problem would happen more frequently. Although various cooling methods have been introduced so far in order to overcome the above problem, those are not sufficient yet since the number of the high-efficiency electric parts mounted to the portable apparatus is increasing. Consequently, a more effective cooling device has been demanded.

SUMMARY OF THE INVENTION

An aspect of the present invention is to solve at least the above problems and/or disadvantages and to provide at least the advantages described below. Accordingly, an aspect of the present invention is to provide a portable apparatus equipped with an improved cooling device for effective cooling performance.

In order to achieve the above-described aspects of the present invention, there is provided a portable apparatus comprising an apparatus body comprising a first main body having therein a plurality of electric parts, and a second main body connected to the first main body to open and close a part of a surface of the first main body; a radiation member mounted in the second main body; and a heat transmitter mounted in the first main body to be connected with the electric parts at one side and contacted with the radiation member when the first main body is opened by operating the second main body, and wherein a driving heat generated by the electric parts is emitted to the outside of the apparatus body by sequentially passing through the heat transmitter and the radiation member.

The radiation member is mounted on a surface of the second main body to be contacted with external air when the first main body is opened.

Accordingly, cooling of the portable apparatus can be effectively achieved since the radiation member is mounted to the second main body which is not subject to frequent contact of the user during operation of the portable apparatus.

According to an embodiment of the present invention, the apparatus body comprises a hinge unit pivotably connecting the first and the second main bodies, and the radiation member and the heat transmitter respectively comprise first and second contact parts contacting each other through pivoting the second main body to open the first main body.

According to another embodiment of the present invention, the apparatus body comprises a slide groove and a slide projection which slidably connect the first and the second main bodies to each other, and the radiation member and the heat transmitter respectively comprise first and second contact parts contacting each other through sliding the second main body to open the first main body. Here, the radiation member is connected to the slide groove, and the heat transmitter comprises the slide projection sliding in contact with the slide groove.

The first contact part is formed as a projection while the second contact part is formed as a groove for receiving the first contact part.

Contacting surfaces of the first and the second contact parts, which are contacted with each other by opening the first main body, are curved.

The portable apparatus further comprises an auxiliary heat transmitter formed on the contacting surfaces of the first and the second contact parts. The auxiliary heat transmitter comprises one of a thermal tape and thermal grease.

The apparatus body further comprises a resilient member resiliently biasing the second main body in a direction for opening the first main body.

Accordingly, efficiency of thermal transmission through contact between the first and the second contact parts can be enhanced.

The heat transmitter comprises a first heat transmitter connected to the electric parts at one side; and a second heat transmitter connected to the first heat transmitter at one side and contacted with the radiation member, being exposed to the outside of the first main body, at the other side. In this case, the first and the second heat transmitters may be integrally formed with each other.

The second main body comprises a first surface being opposed to a user during use of the portable apparatus and a second surface formed on the opposite side to the first surface, and the radiation member is disposed on the second surface of the second main body.

Except a portion corresponding to the radiation member, the outer surface of the apparatus body is formed of a material having lower thermal conductivity than that of the radiation member. In this case, efficiency of thermal transmission is prevented from deteriorating due to contact between the radiation member and the user. Also, the driving heat, which is unpleasant to the user, can be prevented from being transmitted to the user.

BRIEF DESCRIPTION OF THE DRAWING FIGURES

The above aspect and other features of the present invention will become more apparent by describing in detail exemplary embodiments thereof with reference to the attached drawing figures, wherein.

DETAILED DESCRIPTION OF THE EXEMPLARY EMBODIMENTS

Figure 1:
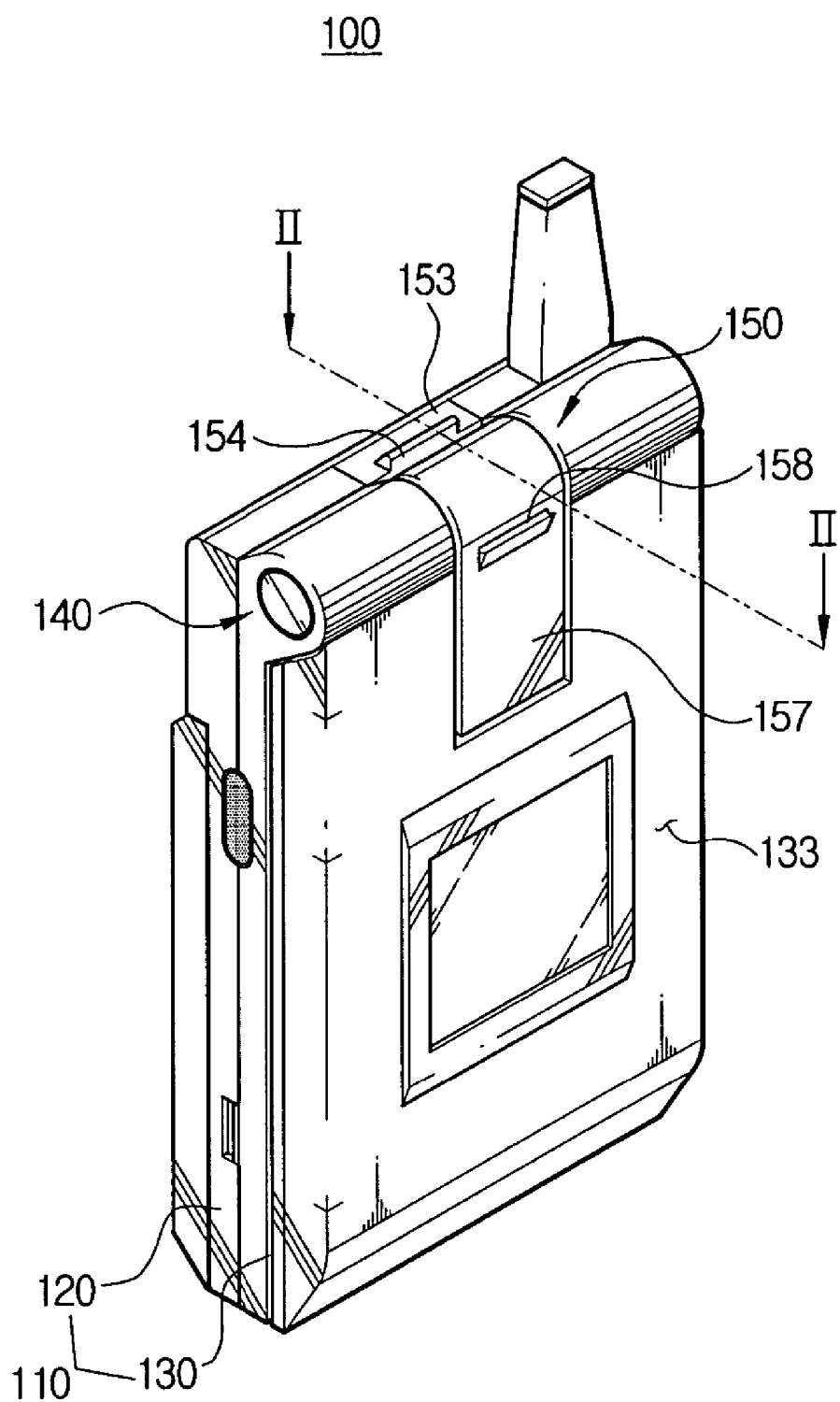
FIG. 1 is a perspective view of a portable apparatus according to a first embodiment of the present invention.

Hereinafter, certain embodiments of the present invention will be described in detail with reference to the accompanying drawing figures.

In the following description, same drawing reference numerals are used for the same elements even in different drawings. The matters defined in the description such as a detailed construction and elements are provided to assist in a comprehensive understanding of the invention. Thus, it is apparent that the present invention can be carried out without those defined matters. Also, well-known functions or constructions are not described in detail since they would obscure the invention in unnecessary detail.

Figure 2:
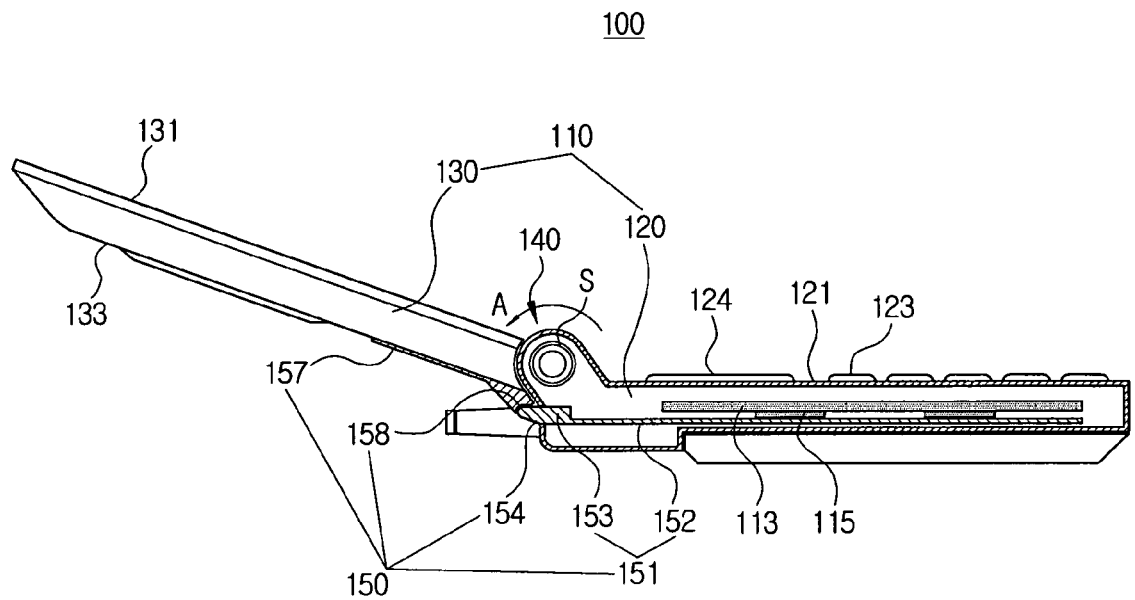
FIG. 2 is a sectional view of FIG. 1 cut along a line II-II, showing the portable apparatus with an operation surface of a first main body opened.
Figure 3:
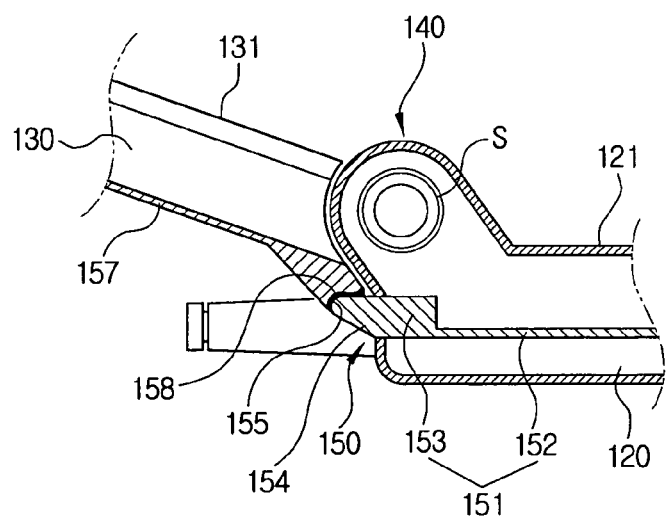
FIG. 3 is a sectional and extracting view showing a cooling device from FIG. 2.

Referring to FIGS. 1 and 3, a portable apparatus 100 according to a first embodiment of the present invention comprises an apparatus body 110 divided into a first main body 120 and a second main body 130 pivotably connected to each other. The first main body 120 controls the overall operation of the portable apparatus 100 and includes therein a plurality of electric parts. The electric parts include a circuit board 113 and an electric element 115. The second main body 130 is connected to the first main body 120 to open and close an operation surface 121 of the first main body 120, where operation keys 123 and a display panel 124 are provided. The second main body 130 may be structured to supplement functions of the first main body 120 with additional dedicated functions. The second main body 130 comprises a first surface 131 being opposed to a user during use of the portable apparatus 100 and a second surface 133 formed on the opposite side to the first surface 131 and therefore being out of sight of the user. The second main body 130 is pivotably connected to the first main body 120 through a hinge unit 140 mounted at one side of the first main body 120. For reference, although FIGS. 2 and 3 are sectional views of the apparatus body 110 of the portable apparatus 100, inside of the second 130 is not illustrated for conciseness.

The portable apparatus 100 according to the present invention comprises a cooling device 150 for cooling of the first main body 120 during the operation thereof. The cooling device 150 comprises a heat transmitter 151 and a radiation board 157.

The radiation board 157 is used as a radiation member that emits a driving heat generated in the first main body 120 to the outside of the portable apparatus 100. Generally, an exterior surface of the portable apparatus 100 is formed of synthetic resin or metal having low thermal conductivity to prevent transmission of the driving heat to the user, which may displease the user. On the other hand, the radiation board 157 is formed of a material, such as copper or aluminum, having relatively higher thermal conductivity than that of the exterior surface of the portable apparatus 100. The radiator board 157 may be disposed not to be seen by the user when the operation surface 121 is opened for use of the portable apparatus 100, nor to be easily contacted with a user's hand when the user grabs the first main body 120 to use the portable apparatus 100. In this regard, the radiation board 157 is disposed on a part of the second surface 133 of the second main body 130. As a result, the user would not be displeased by contact with the radiation board 157 during use of the portable apparatus 100 and furthermore, deterioration of thermal transmission of the portable apparatus 100 caused by the contact with the user's hand can be prevented. In addition, the user does not have to see the radiation board 157 having an unpleasant look while using the portable apparatus 100.

The heat transmitter 151 transmits to the radiation board 157 the driving heat generated from the electric elements 115 mounted in the first main body 120. For this, the heat transmitter 151 of this embodiment comprises first and second transmitters 152 and 153. The first transmitter 152 is contacted at one side with the electric element 115 causing the driving heat during the operation of the portable apparatus 100, and is formed of metal having high thermal conductivity, such as copper or aluminum. The first transmitter 152 may be implemented by a heat pipe that uses a refrigerant. One end of the second transmitter 153 is extended into the first main body 120 and thereby connected to the first transmitter 152, while the other end is exposed to the outside of the first main body 120. Therefore, with only the first and the second transmitters 152 and 153, cooling of the first main body 120 can be achieved by a certain extent. Meanwhile, the first and the second transmitters 152 and 153 may be formed integrally with each other to simplify the manufacture processes. In the same respect, a part of the second transmitter 153, the part exposed to the outside of the first main body 120, is disposed at a location not frequently contacted by the user's hand when the user grabs the first main body 120.

According to an embodiment of the present invention, the heat transmitter 151 and the radiation board 157 are mounted respectively on the first and the second main bodies 120 and 130 so that they contact each other when the operation surface 121 is opened while the portable apparatus 100 is in use. In this case, the hinge unit 140 is not connected to the radiation board 157 and the heat transmitter 151 in order to prevent complexity of the structure of the hinge unit 140 pivotably connecting the first and the second main bodies 120 and 130. Since the complicated structure of the hinge unit 140 causes complicated assembling and maintenance of the portable apparatus 100, the radiation board 157 and the heat transmitter 151 may be separately mounted and contacted with each other only during use of the portable apparatus 100.

For more effective contact between the radiation board 157 and the heat transmitter 151 as described above, a predetermined contact member is provided. As shown in FIG. 3, the contact member comprises a contact projection 154 and a contact recess 158. While the contact projection 154 is formed on an outer surface of the second transmitter 153 adjoining the hinge unit 140, the contact recess 158 is protrudedly formed on one side of the radiation board 157 adjoining the hinge unit 140 so that the contact projection 154 is inserted therein when the operation surface 121 of the first main body 120 is opened. Contacting surfaces of the contact projection 154 and the contact recess 158 may be curved to maximize a contacting area between them with their limited sizes, thereby improving efficiency of thermal transmission between the contact projection 154 and the contact recess 158. By integrally forming the contact projection 154 with the second transmitter 153 and the contact recess 158 with the radiation board 157, manufacture of the contact projection 154 and the contact recess 158 can be more easily achieved.

In this embodiment, various auxiliary techniques can be applied for effective thermal transmission through the contact projection 154 and the contact recess 158. For example, a resilient member S may be used to resiliently bias the second main body 130 in a direction for opening the first main body 120, that is, an arrowed direction A (FIG. 2) of the operation surface 121 being opened. For the resilient member S, any well-known resilient body enabling resilient pivot between the first and the second main bodies 120 and 130 in portable apparatuses, can be adopted. Therefore, detailed description about the resilient member S will be omitted herein. Alternatively, an auxiliary heat transmitter 155 may be dedicatedly mounted in the contact recess 158. According to this, deterioration of thermal transmission efficiency, caused by incomplete contact between the contact projection 154 and the contact recess 158, can be prevented. The auxiliary heat transmitter 155 secures uniform contact between the contact projection 154 and the contact recess 158 and, to this end, is formed of a resilient member as compared with the contact projection 154 and the contact recess 158. The auxiliary heat transmitter 155 can be implemented in various types, such as thermal tape and thermal grease.

According to the cooling device 150 as described above, when the operation surface 121 is opened for use of the portable apparatus 100, the driving heat generated in the first main body 120 sequentially passes through the first and the second heat transmitters 152 and 153, the contact projection 154 and the contact recess 158 and is emitted to the outside of the portable apparatus 100 through the radiation board 157.

Figure 4:
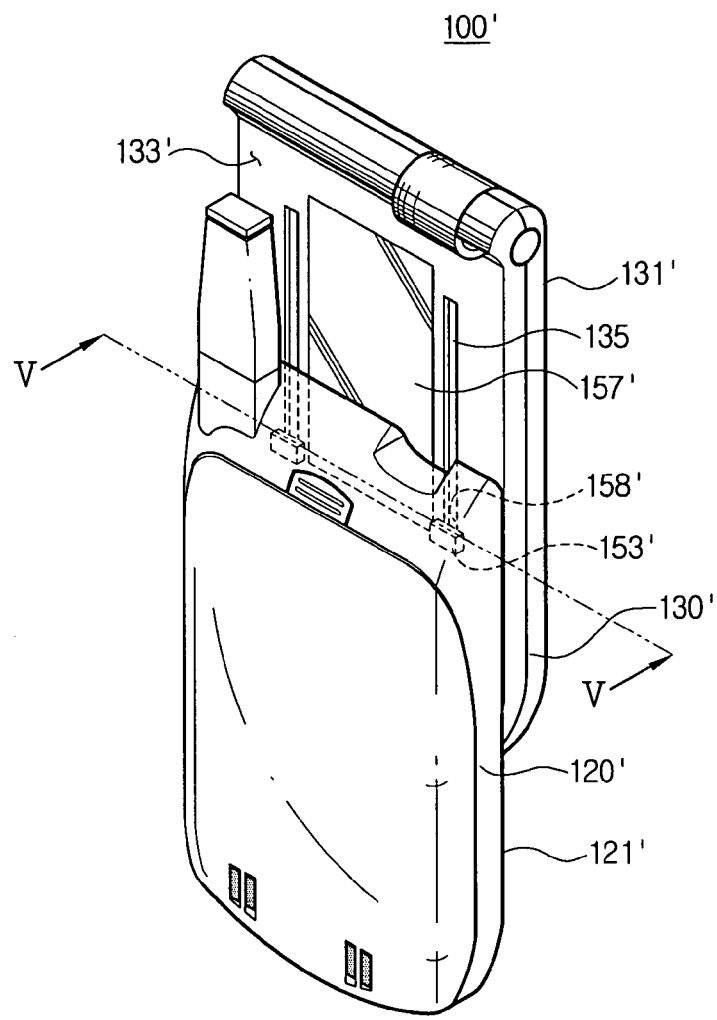
FIG. 4 is a perspective view of a portable apparatus according to a second embodiment of the present invention.
Figure 5:
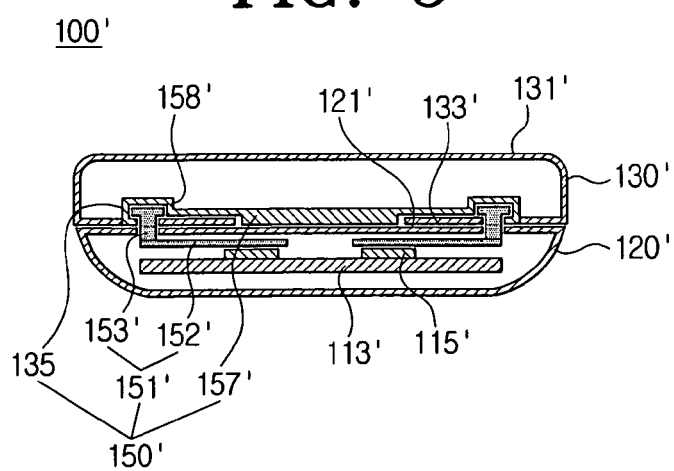
FIG. 5 is a sectional view of FIG. 4 cut along a line V-V.

FIGS. 4 and 5 show a portable apparatus according to a second embodiment of the present invention. Referring to the drawings, a portable apparatus 100' comprises first and second main bodies 120' and 130' sliding upon each other. Therefore, a connection part for engagement between the first and the second main bodies 120' and 130' comprises a slide groove 135 and a slide projection 153'. The second main body 130' includes a first surface 131' being opposed to a user. Accordingly, in a cooling device 150' of the second embodiment, a radiation board 157' is mounted on a second surface 133' of the second main body 130', which is opposed to an operation surface 121' of the first main body 120 as the operation surface 121' is closed. In consequence of this structure, the radiation board 157' formed at a location not frequently contacted can be exposed out of the portable apparatus 100' even when the operation surface 121' is opened, thereby achieving the same effect as the first embodiment. In the second embodiment, in addition, the slide groove 135 and the slide projection 153' for slidable movement of the second main body 130' perform the same function as the contact projection 154 and the contact recess 158 (FIG. 3) of the first embodiment. For this, the slide groove 135 is connected to the radiation board 157 while the slide projection 153' is connected to an electric element 115' on a circuit board 113' of the first main body 120' through a first transmitter 152'. In order not to complicate the structure of the portable apparatus 100', the radiation board 157' and the first transmitter 152' are thermal-transmittably connected to each other only when the operation surface 121' of the first main body 120' is opened. In this regard, a part 158' of the slide groove 135, the part contacting with the slide projection 153' as the operation surface 121' is opened, is connected to the radiation board 157', so that the driving heat of the first main body 120' can be emitted to the outside of the portable apparatus 100', and also connection between the radiation board 157' and the first transmitter 152' can be simplified.

Although a mobile phone has been taken as an example in describing the present invention, the present invention is not limited to this but may be applied to any other portable apparatuses, including those with an accessory device detachably mounted thereto, such as a portable multimedia player (PMP), a digital camera, a personal digital assistant (PDA), and a laptop computer. In addition, as long as the radiation board 157 (157') and the heat transmitter 151 (151') can be contacted with each other by operation of the first and the second main bodies 120 (120') and 130 (130'), the connection structure between the first and the second main bodies 120 (120') and 130 (130') is not limited to the recess (groove) and the projection.

As can be appreciated from the above description, since the radiation board 157 (157') is formed at the second main body 130 (130') that is not frequently contacted with the user during use of the portable apparatus 100 (100'), cooling of the portable apparatus 100 (100') can be more effectively performed. Also, since the heat transmitter 151 (151') of the first main body 120 (120') and the radiation board 157 (157') of the second main body 130 (130') are connected to each other only when the operation surface 121 (121') of the first main body 120 (120') is opened, the structure of the cooling device 150 (150') of the portable apparatus 100 (100') should be simplified.

While the invention has been shown and described with reference to certain embodiments thereof, it will be understood by those skilled in the art that various changes in form and details may be made therein without departing from the spirit and scope of the invention as defined by the appended claims.

What is claimed is:

1. A portable apparatus comprising:
   an apparatus body comprising a first main body having therein a plurality of electric parts, and a second main body connected to the first main body to open and close a part of a surface of the first main body;
   a radiation member mounted in the second main body; and
   a heat transmitter fixedly mounted in the first main body to be connected with the electric parts at one side and contacted with the radiation member only when the first main body is opened by operating the second main body, and
   wherein a driving heat generated by the electric parts is emitted to the outside of the apparatus body by sequentially passing through the heat transmitter and the radiation member.

2. The portable apparatus of claim 1, wherein the radiation member is mounted on a surface of the second main body to be contacted with external air when the first main body is opened.

3. The portable apparatus of claim 2, wherein
   the apparatus body comprises a hinge unit pivotably connecting the first and the second main bodies, and
   the radiation member and the heat transmitter respectively comprise first and second contact parts contacting each other through pivoting the second main body to open the first main body.

4. The portable apparatus of claim 2, wherein
the apparatus body comprises a slide groove and a slide projection which slidably connect the first and the second main bodies to each other, and
the radiation member and the heat transmitter respectively comprise first and second contact parts contacting each other through sliding the second main body to open the first main body.

5. The portable apparatus of claim 4, wherein the radiation member is connected to the slide groove, and the slide projection is connected to a part of the heat transmitter.

6. The portable apparatus of claim 1, wherein the heat transmitter comprises:
a first heat transmitter connected to the electric parts at one side; and
a second heat transmitter connected to the first heat transmitter at one side and contacted with the radiation member, being exposed to the outside of the first main body, at the other side.

7. The portable apparatus of claim 6, wherein the first and the second heat transmitters are integrally formed with each other.

8. The portable apparatus of claim 1, wherein the second main body comprises a first surface being opposed to a user during use of the portable apparatus and a second surface formed on the opposite side to the first surface, and
the radiation member is disposed on the second surface of the second main body.

9. The portable apparatus of claim 8, wherein, except a portion corresponding to the radiation member, the outer surface of the apparatus body is formed of a material having lower thermal conductivity than that of the radiation member.

10. The portable apparatus of claim 1, wherein the apparatus body further comprises a resilient member resiliently biasing the second main body in a direction for opening the first main body.

11. The portable apparatus of claim 1, wherein the heat transmitter is physically contacted by one side with the electric parts.

12. A portable apparatus comprising:
an apparatus body comprising a first main body having therein a plurality of electric parts, and a second main body connected to the first main body to open and close a part of a surface of the first main body;
a radiation member mounted in the second main body; and
a heat transmitter mounted in the first main body to be connected with the electric parts at one side and contacted with the radiation member when the first main body is opened by operating the second main body;
wherein a driving heat generated by the electric parts is emitted to the outside of the apparatus body by sequentially passing through the heat transmitter and the radiation member;
the radiation member is mounted on a surface of the second main body to be contacted with external air when the first main body is opened;
the apparatus body comprises a hinge unit pivotably connecting the first and the second main bodies,
the radiation member and the heat transmitter respectively comprise first and second contact parts contacting each other through pivoting the second main body to open the first main body; and
the first contact part is formed as a projection while the second contact part is formed as a groove for receiving the first contact part.

13. The portable apparatus of claim 12, wherein contacting surfaces of the first and the second contact parts, which are contacted with each other by opening the first main body, are curved.

14. The portable apparatus of claim 12, further comprising an auxiliary heat transmitter formed on the contacting surfaces of the first and the second contact parts.

15. The portable apparatus of claim 14, wherein the auxiliary heat transmitter comprises one of a thermal tape and thermal grease.

* * * * *